June 11, 1968   E. L. ROBERTS   3,387,857
TANDEM WHEEL SUPPORT FOR TRAILERS AND SIMILAR VEHICLES
Filed Oct. 17, 1966   2 Sheets-Sheet 2
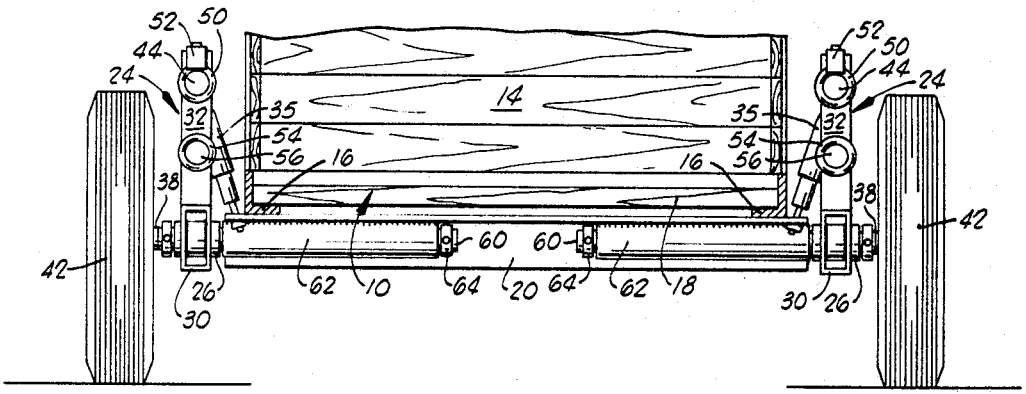
INVENTOR.
ELMER L. ROBERTS
BY
Dunlap and Laney
ATTORNEYS 3,387,857
TANDEM WHEEL SUPPORT FOR TRAILERS
AND SIMILAR VEHICLES
Elmer Lee Roberts, 1137 W. Eufaula,
Norman, Okla. 73069
Filed Oct. 17, 1966, Ser. No. 587,278
4 Claims. (Cl. 280—104.5)

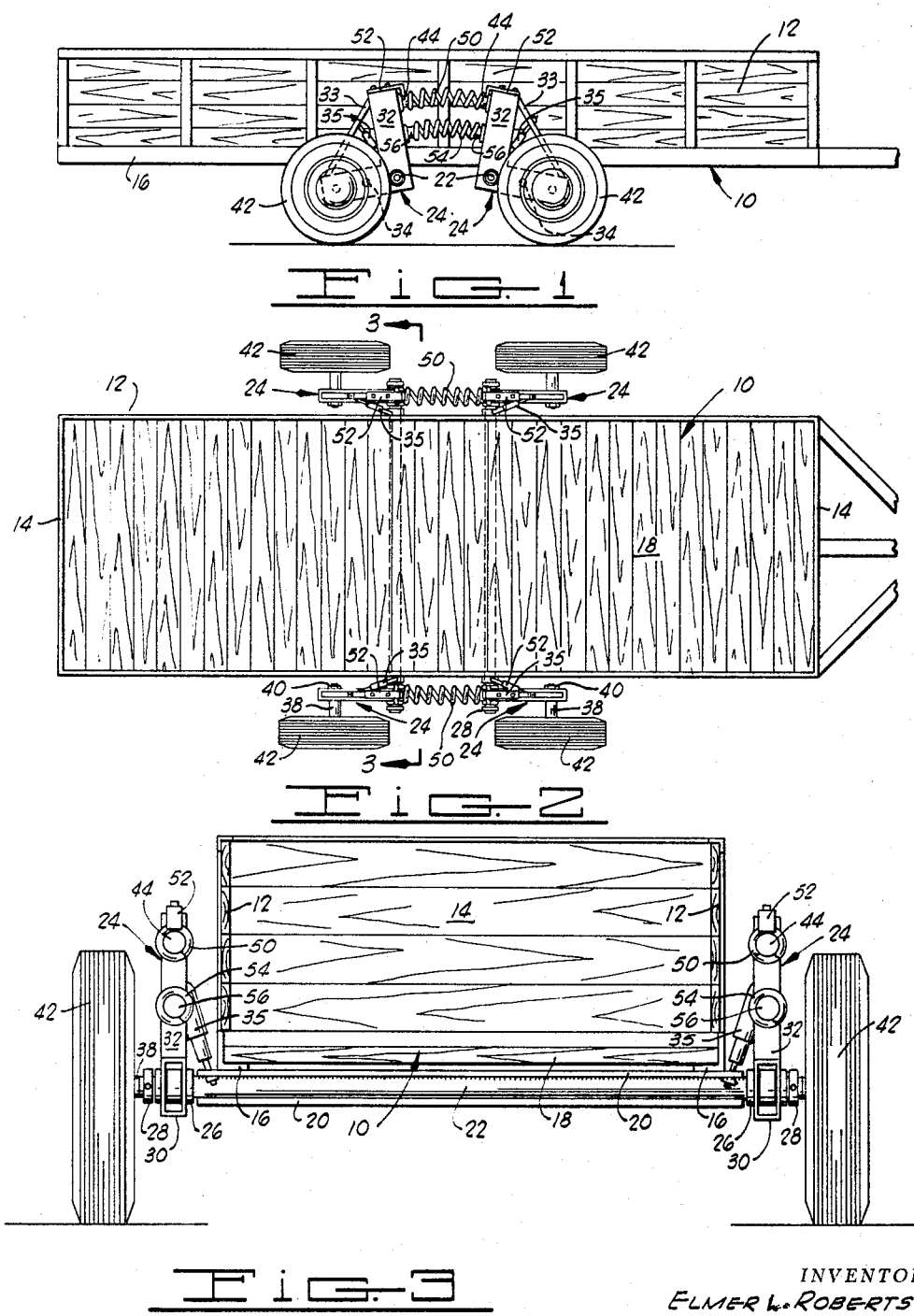

This invention relates to an improved tandem wheel support for trailers and similar vehicles. More specifically, the invention relates to an improved spring suspension used conjunctively with dual or tandem wheels on trailers and similar vehicles for the purpose of permitting the trailer to move more smoothly and evenly over rough terrain, and to permit the weight carried by the trailer to be evenly distributed to each of the wheels in the tandem supporting structure.

A great many proposals have been heretofore advanced for improving the suspension system used for the support of flat bed trailers and similar vehicles on a plurality of wheels. Various arrangements of springs and shock absorbers have been employed in pursuit of the objects of providing a more even distribution of weight to the several wheels utilized, and a more efficient absorption of shocks encountered by the wheels in moving over rough terrain so that the trailer, and the load carried thereby, can be retained in a relatively stable status, and can move evenly and smoothly across the terrain. A typical example of one such arrangement which has been in use for some time is that which is depicted and described in U.S. Patent 2,131,083 issued Sept. 27, 1938. This structure, as well as similar tandem wheel support structures, has been widely utilized, and has achieved to a significant extent, the objects of permitting the tandem wheels to move independently, and transmitting or equally distributing the load carried by the trailer to the several wheels, regardless of the type of terrain over which the trailer may be moving.

The present invention provides an improved tandem wheel suspension system for trailers in which the suspension system may be more economically constructed, and performs more effectively than systems heretofore in use for transmitting the load evenly to all of the wheels used to support the trailer, and for absorbing and smoothing out variations or differences in the loading and shock of impacts transmitted at various times to the different individual wheels used in the suspension of the trailer. Broadly described, the present invention comprises a substantially horizontally extending bed having a pair of oppositely disposed, substantially parallel side edges with pairs of horizontally spaced, elongated axles being provided on the opposite sides of the bed, and connected to, and extending outwardly from, the bed. The horizontally spaced, elongated axles on each side of the bed extend in a direction which is substantially normal to the side edges of the bed, and each carries at its outer end, a wheel supporting frame. The wheel supporting frames secured to each of the elongated axles in each pair of such axles positioned on opposite sides of the bed are spaced horizontally from each other, and each frame includes an upwardly extending portion and a horizontally extending portion, which portions extend substantially normal to the axis of the respective elongated axle upon which it is mounted, and parallel to the adjacent side edge of the bed.

A stub axle is secured to the horizontally extending portion of each of the wheel supporting frames at a point thereon which is spaced generally horizontally from the point of connection of the respective frame to the respective elongated axle. The stub axle provided on each of the wheel supporting frames extends horizontally from its respective wheel supporting frame on the opposite side thereof from the bed of the trailer vehicle. A wheel is rotatably mounted on each of the stub axles. At least one helically coiled spring is detachably supported between the upwardly extending portion of each pair of wheel supporting frames located on the opposite sides of the bed. The helically coiled springs which are used with each pair of wheel supporting frames resiliently bias these frames apart from each other so as to continuously force the wheels carried on the wheel supporting frames into contact with the ground. Each helically coiled spring which is employed is positioned in vertically spaced relation to the points at which the elongated axles connected to the bed are secured to each of the wheel supporting frames on each side of the bed.

In a preferred embodiment of the invention, a plurality of helically coiled springs are employed between each pair of wheel supporting frames and are positioned at different vertical levels between the upwardly extending portions of the pair of wheel supporting frames on opposite sides of the trailer bed. The position and number of the helically coiled springs can be varied in correlation to variations in loading of the trailers so that the ease with which the springs may be compressed and the weight distributed evenly between the two sets of tandemly oriented wheels can be accommodated to the type of load which the trailer must carry. Another salient feature of a preferred embodiment of the invention is the construction of the wheel supporting frames mounted on each of the elongated axles carried by the trailer bed so that the stub axles secured to these wheel supporting frames can be varied in their spacing with respect to the pivotal axis of the respective wheel supporting frames which, of course, is coincident with the axis of the respective elongated axle to which the wheel supporting frame is secured.

The described tandem wheel and spring suspension arrangement of the present invention is characterized in being relatively simply constructed, easily maintained, and very light in weight, the latter characteristic being highly desirable for most types of trailers which are to be towed behind automobiles over relatively rough terrain. No elaborate spring system is required for the proper functioning of the present invention, and the particular types of helically coiled springs which are utilized can be selected to give optimum performance, and can be tailored to the type of load to be carried by the trailer and the type of terrain to be traversed. If one of the springs should be fractured, it can be very easily and quickly replaced by a new spring without the requirement to alter the structure of the spring suspension means and tandem carriage in any way.

A major object of the present invention is to provide a light weight, tandem wheel, spring suspension arrangement for trailers, in which arrangement each of the wheels upon which the trailer is supported may be considered to have a suspension which is independent of the suspension of each of the other wheels.

Another object of the invention is to provide a four-wheel trailer in which each of the wheels can move independently of each of the remaining wheels, and which incorporates a spring suspension system which permits the weight of the trailer and the load carried thereby to be evenly distributed to the several wheels despite the traversal of very rough terrain.

An additional object of the invention is to provide an economic, easily constructed and rugged spring suspension system for use in independently suspending the four wheels employed in a tandem wheel arrangement for a flat bed trailer.

In addition to the foregoing described objects and advantages, other meritorious features of the invention will become apparent as the following detailed description is read in conjunction with the accompanying drawings which illustrate the invention.

In the drawings:

FIGURE 1 is a side elevational view of a trailer provided with the tandem wheel support and suspension system of the present invention.

FIGURE 2 is a plan view of the trailer depicted in FIGURE 1.

FIGURE 3 is a sectional view taken along line 3—3 of FIGURE 2.

FIGURE 4 is a sectional view corresponding to FIGURE 3, but illustrating a modified embodiment of the invention.

FIGURE 5 is an enlarged perspective view of a suspension system constructed in accordance with the present invention, but having the wheels removed for clarity of illustration.

FIGURES 6a-6c are diagrammatic views illustrating the manner in which the tandem wheel support and suspension system of the present invention responds to the traversal of rough or uneven terrain by a trailer upon which the suspension system is used.

Referring now to the drawings in detail, and particularly to FIGURE 1, the flat, substantially horizontal bed 10 of a trailer is provided with sideboards 12 and end gates 14 (see FIGURE 3) as employed in conventional trailer construction. The bed 10 includes a pair of horizontally spaced, elongated angle iron members 16 which support between them planking 18 or other suitable structural members for forming the floor of the bed 10. Secured transversely across the underside of the bed 10 of the trailer by bolting or other suitable means are a pair of angle iron cross braces 20, one of which is shown in FIGURE 3. These cross braces 20 serve as a supporting element and reinforcement for a pair of elongated, generally cylindrical axles 22, which in the embodiment illustrated in FIGURES 1-3, extend completely across the trailer in a transverse direction and project outwardly from opposite sides of the bed 10 beyond the opposed parallel side edges of the trailer. The elongated, generally cylindrical axles 22 are, in most instances, spaced in a horizontal direction by substantially equal distances on opposite sides of the fore-and-aft center line of the trailer, though in the case of some types of trailer utilization involving unequal distribution of loads on the trailer, it may be desirable to place the two axles further toward either the front or the rear of the bed 10.

Journaled on the opposite ends of each of the elongated, generally cylindrical axles 22 are a pair of wheel supporting frames designated generally by reference character 24. The wheel supporting frames 24 are of generally L-shaped configuration, as best shown in FIGURE 1, and are journaled on the ends of their respective axles 22 by means of bearing sleeves 26. A retaining collar 28 is keyed to the outer end of each of the axles 22 to prevent the wheel supporting frames 24 from sliding off the end of the axles. It will be noted in referring to FIGURES 1 and 3 that the L-shaped wheel supporting frames 24 are each journaled on the ends of the axles 22 by means of the bearing sleeves 26 in such a way that the wheel supporting frames pivot about a horizontal pivotal axis which passes through the corner or intersection of the two legs of the L-shaped frames 24. These legs are designated by reference numerals 30 and 32 and are each of hollow rectangular cross-sectional configuration. One of the legs 30 extends in a generally horizontal direction and the other leg 32 extends generally upwardly or vertically therefrom. A diagonal brace 33 extends between the upper end of the upstanding leg 32 and the outer end of generally horizontally extending leg 30 to provide greater structural strength in the wheel supporting frames 24 and also to provide an anchor point for a shock absorber 35 which is connected between the brace 33 and the angle iron 16 most closely adjacent each frame 24.

Spaced along the leg 30 from the bearing sleeve 26 toward the free end thereof are a plurality of stub axle receiving apertures 34. (See FIGURES 1 and 5.) In the arrangement of the invention illustrated in the drawings, a stub axle 38 is shown secured to the leg 30 of each wheel supporting frame 24 through the aperture 34 which is closest the free end thereof, such securement being obtained by passing the stub axles through the hollow leg 30 and securing it on the opposite side thereof by the use of a suitable securing nut 40. A suitable wheel 42 is mounted in conventional manner on the outwardly projecting end of each stub axle 38. It will be readily apparent that should it be desired to do so, the stub axles 38 may, in each case, be removed from the outermost aperture 34 and placed in a different one of the apertures 34 located closer to the pivotal axis of each of the wheel supporting frames 24. The purpose of this arrangement will be hereinafter further explained.

Toward the upper or free end of the upwardly extending legs 32 of each of the wheel supporting frames 24, a spring retaining stud 44 is provided which projects toward the oppositely disposed wheel supporting frame 24, and serves as an aligning and retaining element for a heavy coil spring 50 which is extended between the two upwardly extending legs 32 of the wheel supporting frames 24. A retaining bracket 52 is removably bolted to the upper end of each of the upstanding legs 32 and includes a downwardly projecting flange which hooks over one end of the coil spring 50 and functions to retain the coil spring in the illustrated position during the operation of the suspension system of the invention. A second coil spring 54 may optionally be employed in the suspension system of the invention and is positioned below the coil spring 50 and engaged at its opposite ends by a pair of retaining studs 56 secured to an intermediate portion of the two upstanding legs 32 on each oppositely disposed pair of wheel supporting frames 24.

In the operation of the invention, one or both of the coil springs 50 and 54 is secured in position at a time when one end of the trailer is jacked up or elevated to permit one of the wheel supporting frames 24 to pivot about its respective elongated axle 22. This increases the distance separating the upper ends of the upstanding legs 32 of the two pairs of frames on each side of the truck bed 10 so that one or both of the springs can be interposed between these legs. In the case of relatively light loading of the trailer, the use of only the single coil spring 50 located in the illustrated position will provide a softer ride on the trailer and better tracking of the wheels 42 carried on the stub axles 38 as the trailer traverses rough terrain. It will be noted, of course, that each wheel supporting frame 24 and, of course, the wheel 42 carried thereby, is mounted for independent movement on its respective axle 22, and the only connection between the pairs of wheel supporting frames 24 on each side of the bed 10 is through the yieldable and resilient instrumentality of the coil springs 50 and 54. At the same time, each of the wheel supporting frames 24 functions as a lever so that in the event that a greater portion of the total load on the trailer is imposed on one of the axles 22, this load is transmitted through the compression springs 50 and 54 to the opposed wheel supporting frame 24 which is mounted on the other of the axles 22, thus accomplishing a relatively constant distribution of the total weight of the trailer and its load between the tandem wheels.

An important feature of the present invention which perhaps constitutes the main advance over the prior art as known to applicant is the construction of the wheel supporting frames 24 and the use of the springs 50 and 54 in conjunction therewith to permit the assembly to be best adapted for use under varying conditions of terrain to be traversed by the trailer, and varying conditions of loading of the trailer. Thus, the manner in which the load is distributed to the tandem wheels 42, and the extent to which the wheels will yield to shocks and bumps encountered in rough terrain can be selectively controlled in several ways. For example, a single coil spring can be used and extended between either of the pairs of studs 56 or 44, or diagonally between one of the studs in each pair (to make one of the tandem wheels more yielding than the other). Alternatively, both springs can be used under heavy loading conditions. Finally, the distance at which the wheels 42 are located from the pivotal axes of the frames 24 can be varied at will by merely shifting the stub axles 38 between the several apertures 34.

The action of the tandem wheel and spring suspension system of the present invention can be better understood by referring to FIGURES 6a–6c of the drawings. Here it will be noticed that while the trailer is traversing relatively level ground, the wheels 42 are substantially horizontally aligned, as are the axles 22. The bed 10 of the trailer is maintained in a substantially horizontal plane. In the event, however, that the trailer traverses uneven terrain where either depressions or protuberances exist, one or both of the tandem wheels 42 on either side of the trailer may occupy positions similar to that shown in FIGURES 6b and 6c. Thus, as one of the wheels 42 passes over a high place 46 in the road bed, the wheel supporting frame 24 upon which it is mounted is pivoted upwardly about its axle 22, but the axle 22 per se is not displaced upwardly, and remains in substantially the same plane as the other of the axles 22. Thus, the level status of the bed 10 is retained. Also, the upward pivotation of the wheel supporting frame 24 carrying that wheel 42 which is passing over the high place 46 in the roadway will effectively transfer a portion of the force or impact imparted to its wheel through the springs 50 and 54 to the other wheel supporting frame 24 which is disposed on the same side of the trailer. The reverse of this action occurs when one of the wheels 42 enters a depression 48 in the roadway. Here, the wheel supporting frame 24 which carries the wheel 42 entering the depression pivots in a clockwise direction as shown in FIGURE 6c, thus permitting the wheel 42 to move downwardly, but retaining the axle 22 at the same level. Again, the trailer bed 10 is maintained in its level status.

A modified embodiment of the invention is depicted in FIGURES 4 and 5. Since there is considerable similarity between this embodiment of the invention and that which is depicted in FIGURES 1–3 and which has been hereinbefore described, identical reference numerals are utilized to identify common or identical structural elements which are present in the two embodiments. In the embodiment of the invention depicted in FIGURES 4 and 5, a pair of relatively short axles or axle portions 60 are utilized for supporting the wheel supporting frames 24 in each adjacent pair of such frames, rather than using a pair of elongated, generally cylindrical axles 22 which extend completely across the bed 10 of the trailer as in the embodiment depicted in FIGURES 1–3. The short axles 60 are journaled in a pair of elongated axle sleeves 62 which are secured to the transverse angle iron member 20 as hereinbefore described. The axle sleeves 62 will, in most instances, contain a bronze bushing or other suitable bearing element which is interposed between the axle sleeves 62 and the respective short axle 60 which is journaled therein. A suitable retaining collar 64 is keyed to the inner end of each of the axles 60 to prevent it from working its way outwardly in its axle sleeve 62. As in the case of the elongated transverse axles 22 used in the embodiment of the invention depicted in FIGURES 1–3, the relatively short axles 60 depicted in the embodiment shown in FIGURES 4 and 5 are extended through the bearing collars 26 carried by the wheel supporting frames 24 and carry at their outer ends, retaining collars 38.

In addition to the greater economy of construction which is entailed in the manufacture of the spring suspension and tandem wheel system depicted in FIGURES 4 and 5 as contrasted with the embodiment shown in FIGURES 1–3, the former embodiment of the invention permits the short axles 60 to be actually made fast to the wheel supporting frames 24 by welding or other suitable method of securement if desirable. In such construction, the axles 60 will be permitted to rotate about their longitudinal axes by rotation in the axle sleeves 62. This construction also has the advantage of permitting each of the individual wheel supporting frames 24 and its associated axle 60 to be removed from the bed 10 of the trailer without the necessity of in any way disturbing the opposing axle which carries the wheel supporting frame 24 on the opposite side of the trailer.

The independent action of the tandem wheels, and the versatility of loading and terrain traversal arrangements which can be achieved with the embodiment of the invention depicted in FIGURES 4 and 5 are substantially the same as those which have been described in referring to the embodiment depicted in FIGURES 1–3.

Although certain exemplary embodiments of the invention have been herein described in detail in order to apprise those skilled in the art of the manner in which the invention may be practiced, it will be understood that various changes and modifications can be effected in the structure described and illustrated without departure from the basic principles which underlie the invention. Such changes which do not involve a relinquishment of the described principles of operation are deemed to be circumscribed by the spirit and scope of the invention except as the same may be necessarily limited by the appended claims or reasonable equivalents thereof.

What is claimed is:
1. A trailer vehicle comprising:
a substantially horizontally extending bed having opposed side edges;
a first pair of horizontally spaced, substantially parallel axle portions secured to said bed and extending horizontally and outwardly from one of the side edges of said bed;
a second pair of horizontally spaced, substantially parallel axle portions secured to said bed and extending horizontally and outwardly from a side edge of said bed opposite said one side edge, said second pair of horizontally spaced axle portions extending substantially parallel to said first pair of horizontally spaced axle portions;
a wheel supporting frame mounted on an end of each of said axle portions for pivotation about a substantially horizontal axis and spaced horizontally from said bed, each of said wheel supporting frames including an upstanding leg and a generally horizontally extending leg, said legs intersecting adjacent the point of connection of one of said axles to the respective frame, and said generally horizontally extending leg having a plurality of spaced stub axle receiving apertures formed therethrough;
a stub axle detachably secured in one of the apertures in the horizontally extending leg of each of said wheel supporting frames;
a wheel mounted on each of said stub axles;
at least one coil spring positioned between the upstanding legs of the two wheel supporting frames mounted on the two axle portions in each of said first and second pairs of horizontally spaced, substantially parallel axle portions; and
means for adjustably and removably retaining said coil springs between said upstanding legs in any one of a plurality of preselected positions to selectively accommodate the spring action to the loading of the trailer vehicle and the type of terrain traversed.

2. A trailer vehicle as defined in claim 1 wherein said means for adjustably and removably retaining said coil springs comprises a plurality of spaced, spring retaining studs on each of said upstanding legs with the spring retaining studs on each upstanding leg facing the spring retaining studs on the upstanding leg of the nearest adjacent wheel supporting frame.

3. A trailer vehicle as defined in claim 1 wherein said first and second pairs of axle portions are interconnected to form two elongated, parallel, horizontally spaced axles extending across said bed and outwardly from said opposite side edges of the bed.

4. A trailer vehicle as defined in claim 2 wherein each of said axle portions extends inwardly from the side edge of said bed underneath the bed for a distance of less than half the distance across said bed;

and said trailer vehicle further is characterized to include elongated tubular axle sleeves secured to said bed on the under side thereof and rotatably journaling each of said axle portions; and means for retaining each of said axle portions in its respective axle sleeve.

References Cited

UNITED STATES PATENTS

| | | | |
|---|---|---|---|
| 3,011,795 | 12/1961 | Cox | 280—104.5 |
| 2,131,083 | 9/1938 | Winn | 280—104.5 |
| 2,882,063 | 4/1959 | Strasel | 280—43 |

PHILIP GOODMAN, *Primary Examiner.*